United States Patent
Boyle

(10) Patent No.: US 8,412,881 B2
(45) Date of Patent: Apr. 2, 2013

(54) MODIFIED B+ TREE TO STORE NAND MEMORY INDIRECTION MAPS

(75) Inventor: Nathanial Kiel Boyle, Coquitiam (CA)

(73) Assignee: Intel Corporation, Santa Clara, CA (US)

( * ) Notice: Subject to any disclaimer, the term of this patent is extended or adjusted under 35 U.S.C. 154(b) by 437 days.

(21) Appl. No.: 12/645,170

(22) Filed: Dec. 22, 2009

(65) Prior Publication Data

US 2011/0153979 A1  Jun. 23, 2011

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)
*G06F 7/00* (2006.01)
*G06F 17/30* (2006.01)

(52) U.S. Cl. .... 711/103; 711/209; 707/797; 707/999.03
(58) Field of Classification Search ................ 711/103, 711/209; 707/797, 999.03, E17.05
See application file for complete search history.

(56) References Cited

U.S. PATENT DOCUMENTS

| | | | |
|---|---|---|---|
| 5,146,571 A | | 9/1992 | Logan |
| 5,446,887 A | * | 8/1995 | Berkowitz ............................ 1/1 |
| 5,522,068 A | * | 5/1996 | Berkowitz ............................ 1/1 |
| 6,282,605 B1 | | 8/2001 | Moore |
| 6,535,869 B1 | * | 3/2003 | Housel, III .................... 707/691 |
| 6,711,562 B1 | * | 3/2004 | Ross et al. .................... 707/741 |
| 7,007,027 B2 | * | 2/2006 | Najork et al. ................. 707/722 |
| 7,120,637 B2 | * | 10/2006 | Bailey ........................... 707/797 |
| 2009/0150641 A1 | | 6/2009 | Flynn et al. |
| 2009/0172466 A1 | | 7/2009 | Royer et al. |
| 2010/0100667 A1 | | 4/2010 | Kang et al. |

FOREIGN PATENT DOCUMENTS

| | | |
|---|---|---|
| JP | 09139052 | 5/1997 |
| WO | WO-2007072313 | 6/2007 |

OTHER PUBLICATIONS

Great Britain Examination Report mailed Mar. 4, 2011 for Great Britain Application No. GB1020295.0, 9 pages.
"Office Action for German Patent Application No. 10 2010 053 282.7-53", (Nov. 11, 2011), Whole Document.
"System Programming Guide, IA-32 Intel Architecture Software Developer's Manual, vol. 3, 2001, pp. 3-25, 3-29.—ISSN Order No. 245472", (2001), pp. 3-25, 3-29.

* cited by examiner

*Primary Examiner* — Michael Alsip
(74) *Attorney, Agent, or Firm* — Blakely, Sokoloff, Taylor & Zafman LLP

(57) ABSTRACT

Embodiments of the invention generally pertain to memory devices and more specifically to reducing the write amplification of memory devices without increasing cache requirements. Embodiments of the present invention may be represented as a modified B+ tree in that said tree comprises a multi-level tree in which all data items are stored in the leaf nodes of the tree. Each non-leaf node in the tree will reference a large number of nodes in the next level down from the tree. Modified B+ trees described herein may be represented as data structures used to map memory device page addresses. The entire modified B+ tree used to map said pages may be stored on the same memory device requiring limited amounts of cache. These embodiments may be utilized by low cost controllers that require good sequential read and write performance without large amounts of cache.

13 Claims, 5 Drawing Sheets

MODIFIED B+ TREE TO STORE NAND MEMORY INDIRECTION MAPS

FIELD

Embodiments of the invention generally pertain to memory devices and more specifically to reducing the write amplification of memory devices without increasing cache requirements.

BACKGROUND

Computer devices store data to various types of storage media and devices. Some of these storage media and devices are nonvolatile—i.e., the device persistently stores data when power to a computer system is turned off. An example of a nonvolatile storage device is NAND memory.

Data of non-volatile storage devices may be represented as pages, and pages may be further included in blocks. An operating system (OS) executed via a processor may request or perform actions, such as reading and writing, to particular pages of the storage medium. These pages may be associated with a "physical address" on the storage medium and with a "logical address" within the OS.

A logical address represents an address to which the operating system, disk cache or other logical component may use to access a data page. When a single "write" occurs, there are actually multiple writes that must occur—a write to the physical address and writes associated with updates to the respective logical addresses. The total number of writes that occur during a single "write" operation is referred to as "write amplification."

Prior art optimizations of write amplification—i.e., reducing the actual number of writes for a write transaction, require large amounts of cache RAM, while memory management solutions that utilize small amounts cache RAM typically achieve poor write amplification.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

The descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the present invention relate to methods, apparatuses and systems to improve write amplification of memory devices using low amounts of cache memory. Embodiments of the present invention may be represented as a modified B+ tree representing logical and physical addresses of memory pages. Said modified B+ tree would be utilized with related traversal algorithms and caching policies. Example embodiments of the present invention described herein utilize NAND memory; however, those skilled in the art would know that the following embodiments may be used with other various types of memory devices and non-volatile memories (e.g., phase change memory may utilize embodiments of the present invention).

A B+ tree represents sorted data in a way that allows for efficient insertion, retrieval and removal of records, each of which is identified by a key. In a B+ tree (in contrast to a B− tree) all data is stored at the leaf level of the tree, while keys are stored in interior nodes.

A B+ tree is allows for efficient retrieval of stored data by utilizing a block-oriented storage context. Prior art B+ trees are constructed beginning with the root node, then the internal nodes, and ending with the leaf nodes.

Embodiments of the present invention may be represented as a modified B+ tree in that said tree comprises a multi-level tree in which all data items are stored in the leaf nodes of the tree. Each non-leaf node in the tree will reference a large number of nodes in the next level down from the tree. The data items in the modified B+ tree described herein may be stored sequentially, and thus do not require pointers between nodes that are on the same level of the tree.

Modified B+ trees described herein may be represented as data structures to be used to map memory device page addresses—e.g., logical page addresses to physical page addresses. The entire modified B+ tree used to map said pages may be stored on the same memory device, thereby requiring limited amounts of cache. These embodiments may be utilized by low cost controllers that require good sequential read and write performance without large amounts of cache.

Figure 1:
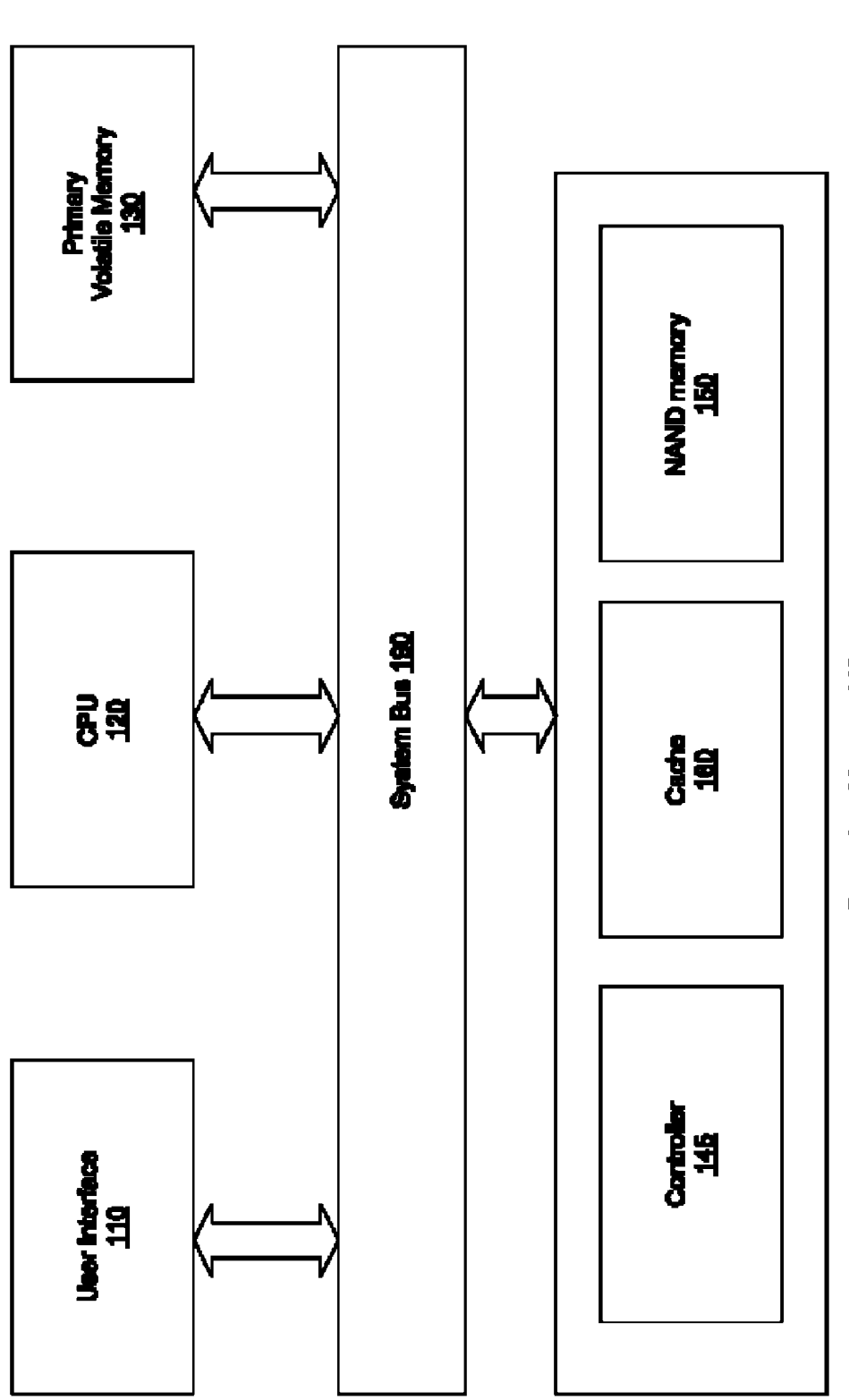
FIG. 1 is a block diagram of a computer system utilizing an embodiment of the invention.

FIG. 1 is a block diagram of a computer system utilizing an embodiment of the invention. Computer system 100 may comprise a desktop computer system, a mobile computing device, or any other general purpose computer processing device.

As shown in FIG. 1, the computer system 100 may include user interface 110, central processing unit (CPU) 120, primary volatile memory 130, and secondary memory 140. Each of the above components may be coupled via system bus 190. The phrase "volatile memory" as used herein refers to memory that requires power to maintain stored information (e.g., cache memory, RAM).

Secondary non-volatile memory 140 may further include controller 145, NAND memory 150 and cache 160. It should be understood that NAND memory 150 is non-volatile memory. The phrase "non-volatile memory" as used herein refers to memory that can maintain stored information even when power is not being supplied thereto. Controller 145 is configured to perform actions involving access, management and use of data contained in NAND memory 150. Cache memory 160 may comprise volatile memory. Controller 145 may utilize cache memory 160 to store information associated with logical page addresses and corresponding physical page addresses for data stored in NAND memory 150 (i.e., nodes of a modified B+ tree). While shown as element 160 within secondary memory 140, cache memory utilized by controller 145 may be included in primary volatile memory 130. Said information stored in cache memory 160, in conjunction with controller 145, may be used by computer system 100 to translate logical addresses to physical address, or vice versa.

In one embodiment, the information stored in cache 160 used by controller 145 comprises elements of a modified a B+ tree. The modified B+ tree as described below allows a low cache RAM controller to cache only a small number of the nodes of the modified B+ tree. The nodes and leaf nodes are also optimized for the NAND page size. Embodiments of the present invention also produce low complexity lookup costs as all logical pages are stored sequentially, and will utilize related traversal algorithms and caching policies.

Figure 2:
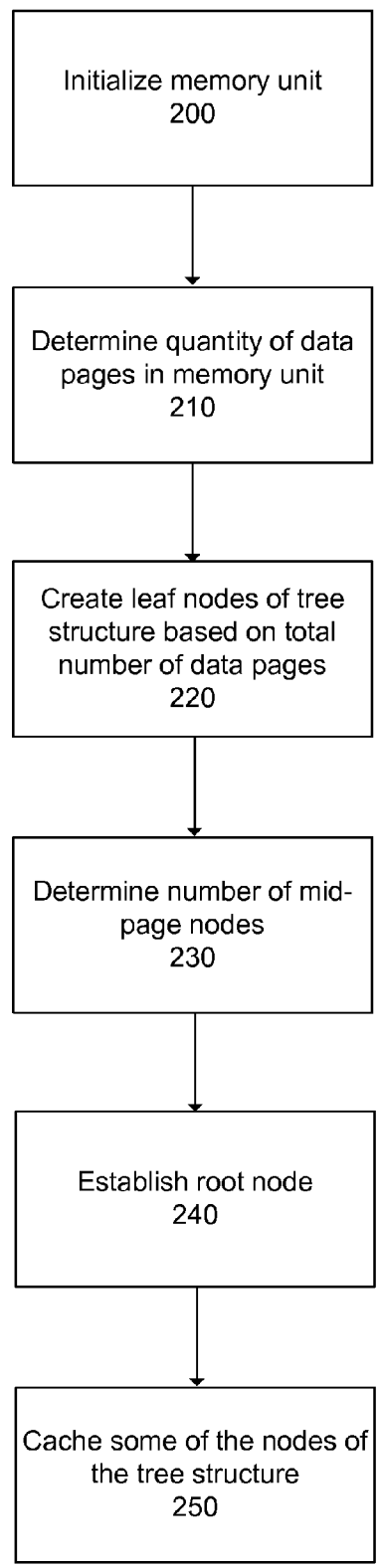
FIG. 2 is a flow diagram of an embodiment of a process of creating a modified B+ tree to map logical address to physical addresses of a NAND memory device.

FIG. 2 is a flow diagram of an embodiment of a process of creating a modified B+ tree to map logical address to physical addresses of a NAND memory device. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

In one embodiment, a memory device of a system is initialized, 200, and the quantity of data pages included in a memory device of a system is determined, 210. Each of the data pages is associated with a physical address and a logical address. The physical address of a memory location indicates a physical location of the data page in the memory device, while the logical address identifies the page to components of the system.

The leaf nodes of a tree structure are created based on the total number of data pages, 220. Each node of the tree structure comprises a data page and has a node capacity equal to the data page size. The nodes will store a number of logical addresses; the number of logical addresses is determined by a data page size and the number of physical addresses in the memory device. In one embodiment, the number of addresses stored by the node is determined by the following integer division operation:

(page size in bytes)/(physical pages in the system).

The number of mid-page nodes for the tree structure is determined by the number of logical addresses in the system and the node capacity, 230. In one embodiment, the number of mid-page nodes is determined by the ceiling of the following integer division operation:

(page addresses in system)/((page addresses per node)^2).

A root node is established in the tree to store the address of the at least one mid-level node, 240. Some of the nodes of the tree structure are then cached, 250. As a result of the modified B+ tree being "bottom heavy" (i.e., full leaf nodes), a low cache RAM controller may only need to cache the root node, mid-level nodes and at least one leaf node to utilize the optimized memory access if a page of RAM is equal to a page of the NAND memory device.

Figure 3:
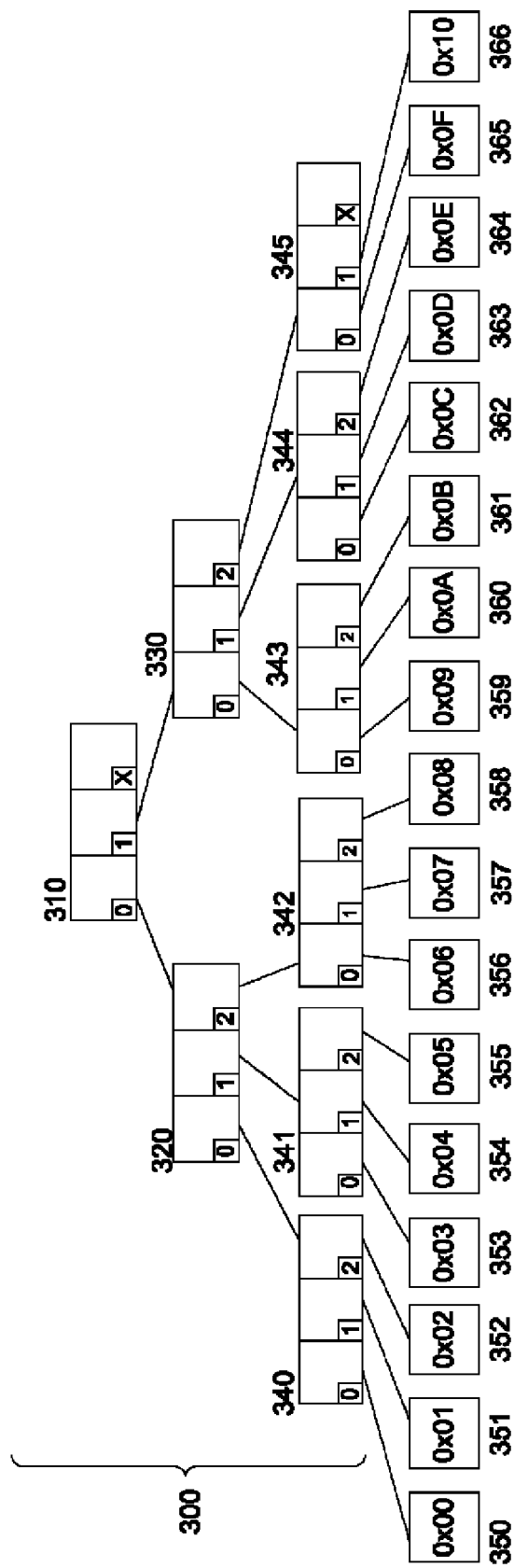
FIG. 3 is a block diagram of an example embodiment of a modified B+ tree.

FIG. 3 is a block diagram of an example embodiment of a modified B+ tree. Tree 300 contains a small amount of physical pages to illustrate how a tree may be constructed and traversed. Embodiments typically involve significantly larger amounts of physical pages.

The number of page addresses per node for tree 300 may be determined by the example equation described above:

pageAddressesPerNode=pageSizeInBytes/physicalPagesInSystem.

In FIG. 3, pageSizeInBytes=64 and physicalPagesInSystem=17; therefore, the pageAddressesPerNode=3.

The number of mid-page nodes for tree 300 may be determined by the example equation described above:

numMidPageNodes=ceil(physicalPagesInSystem/(pageAddressesPerNode*pageAddressesPerNode))

In FIG. 3 physicalPagesInSystem=17 and pageAddressesPerNode=9; therefore, the numMidPageNodes=2 (i.e., ceil(17/9)=2).

In order to translate a logical address to the corresponding physical address, modified B+ tree 300 must be traversed starting from root node 310, to mid-page nodes 320 and 330, to leaf nodes 340-345. Each of the leaf nodes will identify physical pages 350-366. The following example equation may be used to determine which root node index follow to find the appropriate mid-page node:

rootNodeIndex=logicalPageAddress/(pageAddressesPerNode*pageAddressesPerNode).

In FIG. 3, traversing tree 300 to obtain the physical page for LogicalPageAddress=0xB starts with utilizing the equation above. Using the value for pageAddressesPerNode discussed above will yield:

rootNodeIndex=11/9=1.

In FIG. 3, index [1] of root node 310 points to mid-page node 330.

The following example equation may be used to determine which mid-page node index of mid-page node 330 to follow to find the appropriate leaf node.

midNodeIndex=(logicalPageAddress/pageAddressesPerNode) % pageAddressesPerNode.

For logicalPageAddress=0xB:

midNodeIndex=(11/3) %3=3%3=0.

In FIG. 3, index [0] of mid-page node 330 points to leaf node 343.

The following example equation may be used to determine which leaf node index of leaf node 343 to follow to find the appropriate physical page.

leafIndex=logicalPageAddress % pageAddressesPerNode.

For LogicalPageAddress=0xB:

leafIndex=11% 3=2.

In FIG. 3, index [2] of leaf node 343 points to physical page 361. Thus, traversing tree 300 using LogicalPageAddress 0xB will translate the logical address to physical page 361 by way of 310[1]-330[0]-343[2]. The above example illustrates that sorting the entries of tree 300 sequentially allows for low complexity in memory lookups.

Figure 4:
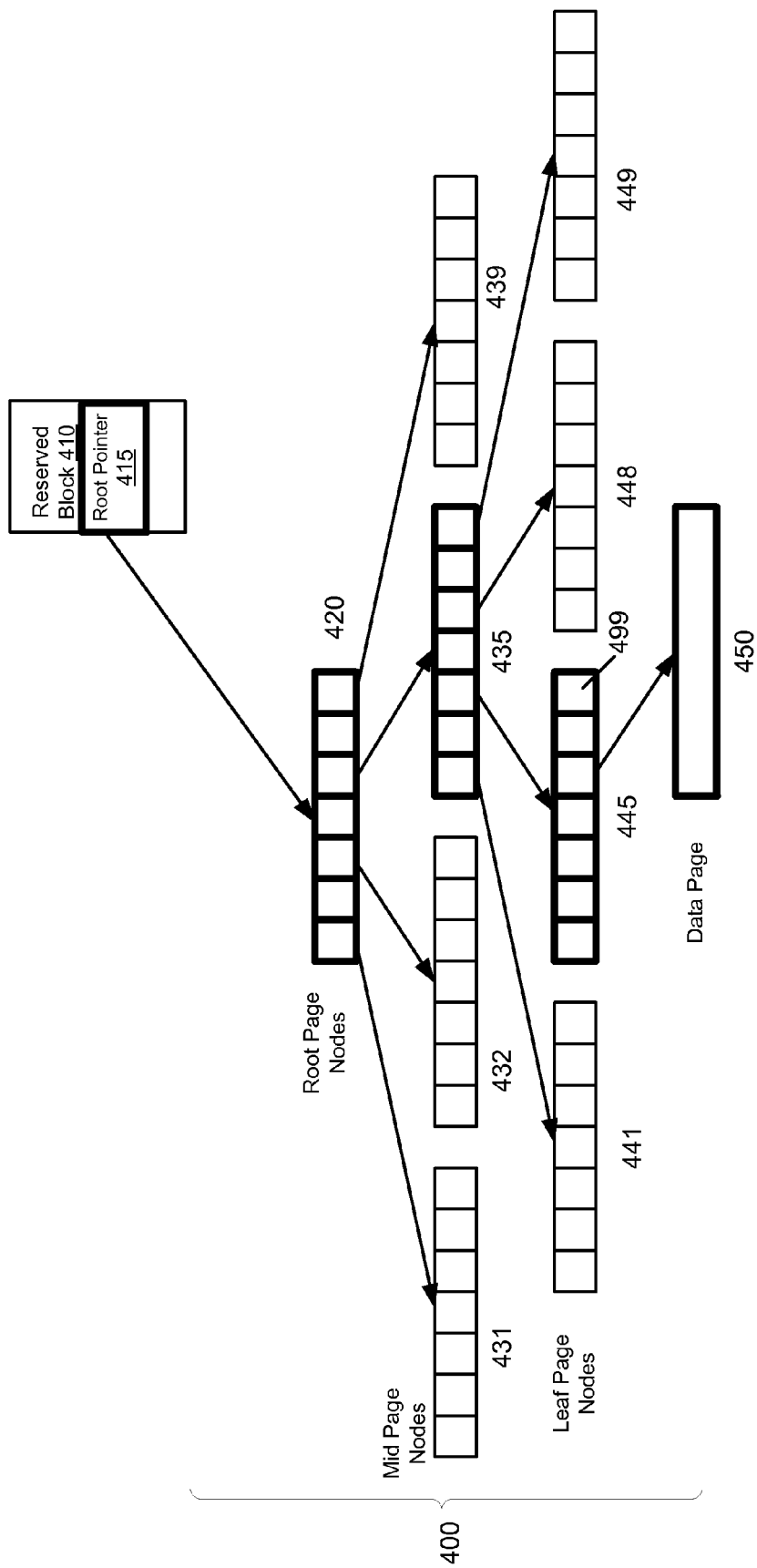
FIG. 4 is a block diagram illustrating a read traversal of the modified B+ tree.

FIG. 4 is a block diagram illustrating a read traversal of the modified B+ tree. The number of nodes and entries shown in the root node (420), mid-page nodes (431, 432, 435 and 439) and leaf page nodes (441, 445, 448 and 449) are for illustrative purposes only, and are not shown to illustrate the proper number of nodes or entries in each of the respective nodes.

Traversal of tree 400 to find physical page location 450 of a logical page address is done by reading and caching the root page node 420 (in a NAND memory device, this is the first read after power-up; otherwise it will be cached). The location of root page node 420 is determined by root pointer 415, which is stored in reserved block 410. The mid-page node that is addressed in the root page node is determined by a traversal algorithm. In FIG. 4, the corresponding mid-page node is node 435. This node is read and cached.

The appropriate mid-page node index, as determined by the traversal algorithm, will point to the corresponding leaf page node. In FIG. 4, the corresponding leaf page node is node 445. A caching policy may be applied in order to determine whether to cache leaf page node 445. The determination to cache leaf page node 445 may further be dependent on available cache RAM.

The physical page address of data page 450 is the value included in the corresponding leaf node index of leaf page node 445. It should be noted that in the above algorithm, once all the root and mid-page nodes are cached there, is at most one read from NAND required to find the physical addresses for any logical addresses. For sequential accesses, no additional reads are typically required since the logical to physical entries of the leaf nodes are stored sequentially. So as long as the sequential accesses do not go past the last page referenced in a leaf page node (i.e., past index 499 in leaf node 445), no additional node read is required. This leads to improved sequential read performance over the prior art.

Figure 5:
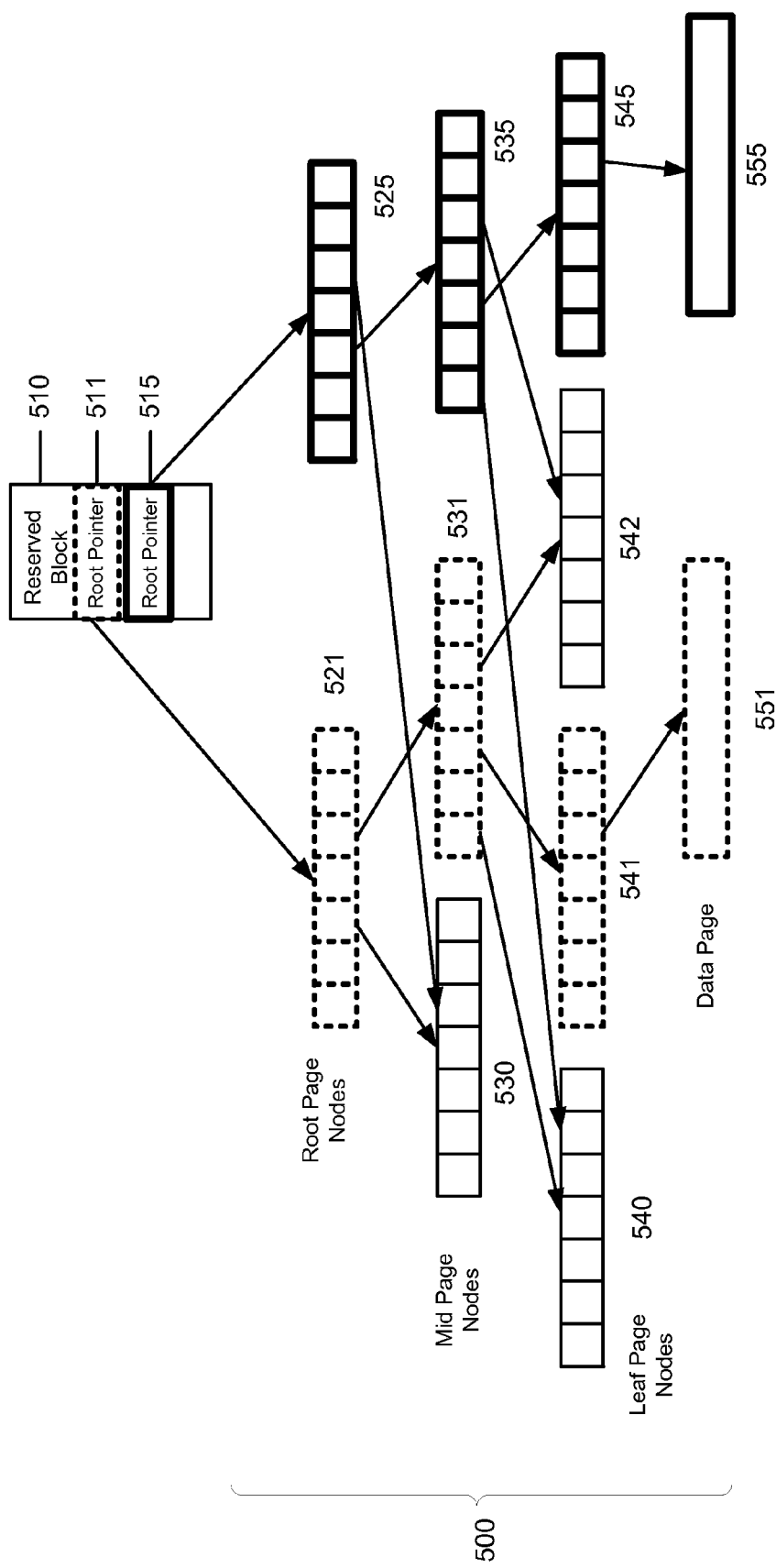
FIG. 5 is a block diagram of a modified B+ tree during the execution of a write.

FIG. 5 is a block diagram of a modified B+ tree during the execution of a write. The number of nodes and entries shown in the root node (521, 525), mid-page nodes (530, 531, 535) and leaf nodes (540, 541, 542 and 545) are for illustrative purposes only, and are not shown to illustrate the proper number of nodes or entries in each of the respective nodes.

An update (e.g., a write back) to data page 551 is shown as updated page 555. Updating tree 500 includes first updating the cached copy of leaf page node 541. The leaf page node needs to be updated every time a page is written to the NAND. New leaf page node 545 is shown to point to updated page 555.

The new physical page location of the leaf page node 545 needs to be updated. Periodic updates of NAND copies of root page node 521 and mid-page node 531 are also illustrated as new nodes 525 and 535 respectively. These periodic updates are required for data integrity purposes.

Reserved block 510 is updated with root pointer 515 to replace root pointer 511. Since sequential writes access the same cached leaf page node, the illustrated embodiment performs well with sequential writes to physical pages referenced by the same leaf page node.

Various components referred to above as processes, servers, or tools described herein may be a means for performing the functions described. Each component described herein includes software or hardware, or a combination of these. The components can be implemented as software modules, hardware modules, special-purpose hardware (e.g., application specific hardware, ASICs, DSPs, etc.), embedded controllers, hardwired circuitry, etc. Software content (e.g., data, instructions, configuration) may be provided via an article of manufacture including a computer storage readable medium, which provides content that represents instructions that can be executed. The content may result in a computer performing various functions/operations described herein. A computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A system comprising:

a memory device organized as a plurality of data pages, each of the plurality of data pages to be associated with a physical address and a logical address, the physical address to indicate a memory location of the data page in the memory device, the logical address to identify the page to a component of the system;

a tree structure stored in the memory device, the tree structure to organize the plurality of data pages, each node of the tree structure to have a node capacity to store a number of logical addresses, the node capacity to be determined by a data page size and a number of physical addresses in the memory device, the tree structure to further include a plurality of leaf nodes to represent the logical addresses of the data pages of the memory device, and each leaf node to include the physical address of one of the data pages, a plurality of mid-level nodes to store the addresses of the leaf nodes, and a root node to store the addresses of the plurality of mid-level nodes;

a cache unit to store copies of some of the nodes of the tree structure; and a memory controller to determine the physical address of the page based on the logical address of the page; wherein the physical addresses of the data pages to be stored only in the plurality of leaf nodes, the plurality of leaf nodes to sequentially store the physical addresses of the data pages of the system and the plurality of mid-level nodes to sequentially store the addresses of the leaf nodes, and determining the physical address of the page includes identifying an index of the root node by obtaining the quotient of the logical address of the page divided by the result of the node capacity squared, the index of the root node to identify a mid-level node, identifying an index of the mid-level node by dividing, the remainder of the result of the quotient of the logical address divided by the node capacity, by the node capacity, the index of the mid-level node to identify a leaf node, and identifying an index of the leaf node by obtaining the remainder of the result of logical address divided by the node capacity, the index of the leaf node to identify the physical address of the page.

2. The system of claim 1, wherein the memory device comprises a NAND memory device.

3. The system of claim 1, the cache unit to store copies of the root node, at least one mid-level node, and at least one of the leaf nodes.

4. The system of claim 1, wherein the number of mid-level nodes is determined by the number of logical addresses in the system and the node capacity.

5. A method comprising:
   initializing a memory device including a plurality of data pages, each of the plurality of data pages to be associated with a physical address and a logical address, the physical address to indicate a physical location of the data page in the memory device, the logical address to identify the page to a computing device;
   creating a tree structure to organize the plurality of data pages, each node of the tree structure to have a node capacity to store a number of logical addresses, the node capacity to be determined by a data page size and a number of physical addresses in the memory device, the tree structure to further include
      a plurality of leaf nodes to represent the logical addresses of the data pages of the memory device, and each leaf node to include the physical address of one of the data pages,
      a plurality of mid-level nodes to store the addresses of the leaf nodes;
   storing some of the nodes of the tree structure in a cache of the memory device, wherein the physical addresses of the data pages are stored only in the plurality of leaf nodes, the plurality of leaf nodes are sequentially stored the physical addresses of the data pages of the system and the addresses of the leaf nodes are sequentially stored in the plurality of mid-level nodes;
   determining, via a memory controller, the physical address of the page based on the logical address of the page;
   identifying an index of the root node by obtaining the quotient of the logical address of the page divided by the result of the node capacity squared, the index of the root node to identify a mid-level node;
   identifying an index of the mid-level node by dividing, the remainder of the result of the quotient of the logical address divided by the node capacity, by the node capacity, the index of the mid-level node to identify a leaf node; and
   identifying an index of the leaf node by obtaining the remainder of the result of the logical address divided by the node capacity, the index of the leaf node to identify the physical address of the page.

6. The method of claim 5, wherein the memory device comprises a NAND memory device.

7. The method of claim 5, wherein storing some of the nodes of the tree structure includes storing the root node, at least one mid-level node, and at least one of the leaf nodes.

8. The method of claim 5, wherein the number of mid-level nodes is determined by the number of logical addresses in the system and the node capacity.

9. An article of manufacture comprising a computer-readable storage medium having instructions stored thereon to cause a processor to perform operations including:
   initializing a memory device including a plurality of data pages, each of the plurality of data pages to be associated with a physical address and a logical address, the physical address to indicate a physical location of the data page in the memory device, the logical address to identify the page to a computing device;
   creating a tree structure to organize the plurality of data pages, each node of the tree structure to have a node capacity to store a number of logical addresses, the node capacity to be determined by a data page size and a number of physical addresses in the memory device, the tree structure to further include
      a plurality of leaf nodes to represent the logical addresses of the data pages of the memory device, and each leaf node to include the physical address of one of the data pages,
      a plurality of mid-level nodes to store the addresses of the leaf nodes, and
      a root node to store the addresses of the plurality of mid-level nodes;
   storing nodes of the tree structure in a cache of the memory device; wherein the physical addresses of the data pages are stored only in the plurality of leaf nodes, the plurality of leaf nodes are sequentially stored the physical addresses of the data pages of the system and the addresses of the leaf nodes are sequentially stored in the plurality of mid-level nodes; and
   determining, via a memory controller, the physical address of the page based on the logical address of the page, wherein determining includes:
      identifying an index of the root node by obtaining the quotient of the logical address of the page divided by the result of the node capacity squared, the index of the root node to identify a mid-level node,
      identifying an index of the mid-level node by dividing, the remainder of the result of the quotient of the logical address divided by the node capacity, by the node capacity, the index of the mid-level node to identify a leaf node, and
      identifying an index of the leaf node by obtaining the remainder of the result of the logical address divided by the node capacity, the index of the leaf node to identify the physical address of the page.

10. The article of manufacture of claim 9, wherein the memory device comprises a NAND memory device.

11. The article of manufacture of claim 9, wherein storing nodes of the tree structure includes storing the root node, at least one mid-level node, and at least one of the leaf nodes.

12. The article of manufacture of claim 9, wherein the number of mid-level nodes is determined by the number of logical addresses in the system and the node capacity.

13. The article of manufacture of claim 9, wherein the memory device comprises a phase change memory device.

* * * * *